(12) United States Patent
Conrad

(10) Patent No.: US 7,093,841 B2
(45) Date of Patent: Aug. 22, 2006

(54) SEATING/STORAGE ADD-ON SECTION WITH HOLSTER FOR SHOPPING CART

(75) Inventor: Steven S. Conrad, Rogers, AR (US)

(73) Assignee: Assembled Products Corporation, Rogers, AR (US)

( * ) Notice: Subject to any disclaimer, the term of this patent is extended or adjusted under 35 U.S.C. 154(b) by 9 days.

(21) Appl. No.: 10/724,538

(22) Filed: Nov. 26, 2003

(65) Prior Publication Data
US 2004/0160027 A1 Aug. 19, 2004

Related U.S. Application Data

(60) Provisional application No. 60/430,521, filed on Nov. 27, 2002.

(51) Int. Cl.
*B62D 39/00* (2006.01)
(52) U.S. Cl. ............................ 280/33.993; 280/33.991; 280/DIG. 4
(58) Field of Classification Search .......... 280/DIG. 4, 280/33.991, 33.992, 33.993, 250.1, 33.997, 280/33.994, 47.34, 47.35; 297/256.15, 256.16
See application file for complete search history.

(56) References Cited

U.S. PATENT DOCUMENTS

| | | | | |
|---|---|---|---|---|
| 3,044,801 A * | 7/1962 | Vicany | .................. | 280/202 |
| 3,428,332 A * | 2/1969 | McCance | .................. | 280/402 |
| 3,524,512 A * | 8/1970 | Voeks et al. | .............. | 180/14.1 |
| 3,912,032 A * | 10/1975 | Benz et al. | ................... | 180/13 |
| 4,096,920 A * | 6/1978 | Heyn | ............................ | 180/11 |
| 4,155,678 A * | 5/1979 | Lehman et al. | ............. | 414/483 |
| 4,305,601 A * | 12/1981 | Berge | ..................... | 280/304.1 |
| 4,484,755 A * | 11/1984 | Houston | ................ | 280/33.992 |
| 4,534,579 A * | 8/1985 | Shackelford, Sr. | .......... | 280/402 |
| 4,695,071 A | 9/1987 | Johnston | | |
| 4,771,840 A * | 9/1988 | Keller | .......................... | 180/11 |
| 5,011,169 A * | 4/1991 | Henderson et al. | ......... | 280/202 |
| D318,550 S * | 7/1991 | Stefano | ....................... | D34/21 |
| 5,064,209 A * | 11/1991 | Kurschat | ..................... | 280/204 |
| 5,145,308 A * | 9/1992 | Vaughn et al. | .............. | 414/462 |
| 5,207,286 A * | 5/1993 | McKelvey | ................... | 180/13 |
| 5,312,122 A * | 5/1994 | Doty | ..................... | 280/33.992 |
| 5,322,306 A | 6/1994 | Coleman | | |
| 5,350,184 A * | 9/1994 | Hull et al. | .................. | 280/204 |
| 5,439,069 A * | 8/1995 | Beeler | ......................... | 180/11 |
| 5,823,548 A * | 10/1998 | Reiland et al. | ........ | 280/33.993 |
| 5,848,797 A * | 12/1998 | Paez | ..................... | 280/33.993 |
| 5,906,386 A * | 5/1999 | Baker et al. | ................. | 280/404 |
| 6,022,031 A * | 2/2000 | Reiland et al. | ........ | 280/33.993 |
| 6,270,093 B1 * | 8/2001 | Johnson et al. | ........ | 280/33.993 |
| 6,315,306 B1 * | 11/2001 | Fernie et al. | .......... | 280/33.991 |
| 6,354,777 B1 * | 3/2002 | Riekki | ............................ | 410/3 |
| 6,464,238 B1 * | 10/2002 | Reiland et al. | ........ | 280/33.993 |
| 6,575,480 B1 * | 6/2003 | McKelvey | ............. | 280/33.993 |
| 6,702,313 B1 * | 3/2004 | Forshee et al. | .......... | 280/304.1 |
| 6,766,871 B1 * | 7/2004 | Sawyer | ........................ | 180/13 |

FOREIGN PATENT DOCUMENTS

DE 4202428 A1 * 8/1992

\* cited by examiner

*Primary Examiner*—Christopher P. Ellis
*Assistant Examiner*—Kelly E. Campbell
(74) *Attorney, Agent, or Firm*—Boyd D. Cox

(57) ABSTRACT

The present invention is a seating/storage add-on section for use with a shopping cart, having a non-rigid connector for engaging the rear wheels of a shopping cart. In addition, the connector allows relative movement between the add-on section and an attached shopping cart. The shopping cart can be quickly attached to and detached from the add-on section without requiring tools.

3 Claims, 8 Drawing Sheets

SEATING/STORAGE ADD-ON SECTION WITH HOLSTER FOR SHOPPING CART

Priority for this application is claimed from U.S. Provisional Application No. 60/430,521 entitled "Seating/Storage Add-On Section with Holster for Shopping Cart" filed on Nov. 27, 2002

BACKGROUND

The present invention is directed to a seating/storage add-on section having a non-rigid coupling means for attaching to a shopping cart. The add-on section can be retrofitted to various sized shopping carts and provides additional seating and storage space on the cart. The non-rigid coupling means readily connects with a shopping cart and allows relative movement between the add-on section and the cart. The add-on section can be quickly and easily disconnected from an attached shopping cart.

Conventional shopping carts generally comprise a basket on a wheeled frame and a collapsible seat mounted in the basket. Such collapsible seats are intended to accommodate one small child, but for a shopper who has more than one child or whose child is too large to use the collapsible seat, shopping is made more difficult.

Devices that provide additional seating for shopping carts have been developed to accommodate those shoppers whose seating requirements exceed the limited capacity provided by a collapsible seat in a conventional cart. Some of these seating devices are integrally formed with the shopping cart so that the cart and seating device cannot be separated from each other. While such an integral device provides additional cart seating for shoppers, the shopping cart can only be used with the seating device.

Other types of seating devices exist that can be releasably attached to a shopping cart. Some of these devices can be retrofitted to an existing shopping cart to provide additional seating for children. However, installing such a device on a cart can require tools, skill and time, so that it can be a frustrating and lengthy task. Removing the device from the cart can be equally frustrating for the same reasons. Once attached, the shopping cart is generally dedicated to exclusive use with the seating device. This limits the versatility of the shopping cart and can be a drawback when there may be a shortage of carts available for shoppers not requiring the additional seating of the combined unit.

In addition, the seating device and attached cart are usually stored as a combined unit since the connection between the two cannot be readily disengaged. A combined unit is unable to nest with other units as do conventional, unattached shopping carts. Each combined unit requires the full length of the shopping cart and the attached seating device for storage. Consequently, more space is required for storing the combined units than would be needed for storing carts separately from the seating devices.

When the seating device and attached cart of the combined unit are rigidly connected to each other, the rigid connection deters relative movement between the device and the cart. This is especially disadvantageous when the combined unit is used on uneven surfaces, including curbs, speed bumps and ramps. When crossing an uneven surface, one or more wheels of the seating device and/or cart can leave the ground. The combined unit will remain rigid, thereby placing undue stress on the connector. This stress can loosen and/or damage the connector which necessitates frequent inspection and maintenance of the combined unit at an increased cost to the owner.

For the foregoing reasons, there is a need for a seating/storage add-on section having a non-rigid coupling means that can be readily attached and detached from a shopping cart so that the add-on section can be quickly installed or removed when desired. The need also exists for a non-rigid coupling means that allows for relative movement between the add-on section and an attached shopping cart.

SUMMARY

The present invention is directed to a seating/storage add-on section that can be readily attached and detached from a shopping cart and that allows relative movement between the add-on section and an attached shopping cart.

The add-on section comprises a base with a platform, a seating assembly and non-rigid coupling means. The coupling means is a non-rigid connector which comprises a holster formed by a pair of receptacles disposed on the front of the base. The connector enables the add-on section to readily attach to and detach from a shopping cart. To attach a shopping cart, each of the rear wheels of the cart is lowered into a respective receptacle of the add-on section's connector and held therein. The combined unit, comprising the add-on section and an attached cart, can then be maneuvered via a handle on the add-on section. To detach the shopping cart, the rear wheels of the cart are lifted out of the respective receptacles.

It is an object of the present invention to provide a seating/storage add-on section that can be readily attached and detached from a shopping cart.

It is a further object of the present invention to provide a seating/storage add-on section for a shopping cart in which the add-on section can move independently of the attached shopping cart.

It is a further object of the present invention to provide a seating/storage add-on section with a non-rigid coupling means that allows movement between the add-on section and the attached shopping cart.

It is a further object of the present invention to provide a seating/storage add-on section having a connector that engages the rear wheels of a shopping cart.

It is a further object of the present invention to provide a seating/storage add-on section with a holster that receives and holds the rear wheels of a shopping cart thereby attaching the cart to the add-on section.

It is a further object of the present invention to provide a seating/storage add-on section with a connector that can be engaged and disengaged without the use of tools.

It is a further object of the present invention to provide a seating/storage add-on section that can be readily detached from a shopping cart for easier storage.

BRIEF DESCRIPTION OF THE DRAWINGS

Reference is made to the accompanying drawings in which are shown illustrative embodiments of the invention and from which novel features and advantages will be apparent.

DETAILED DESCRIPTION

Figure 1:
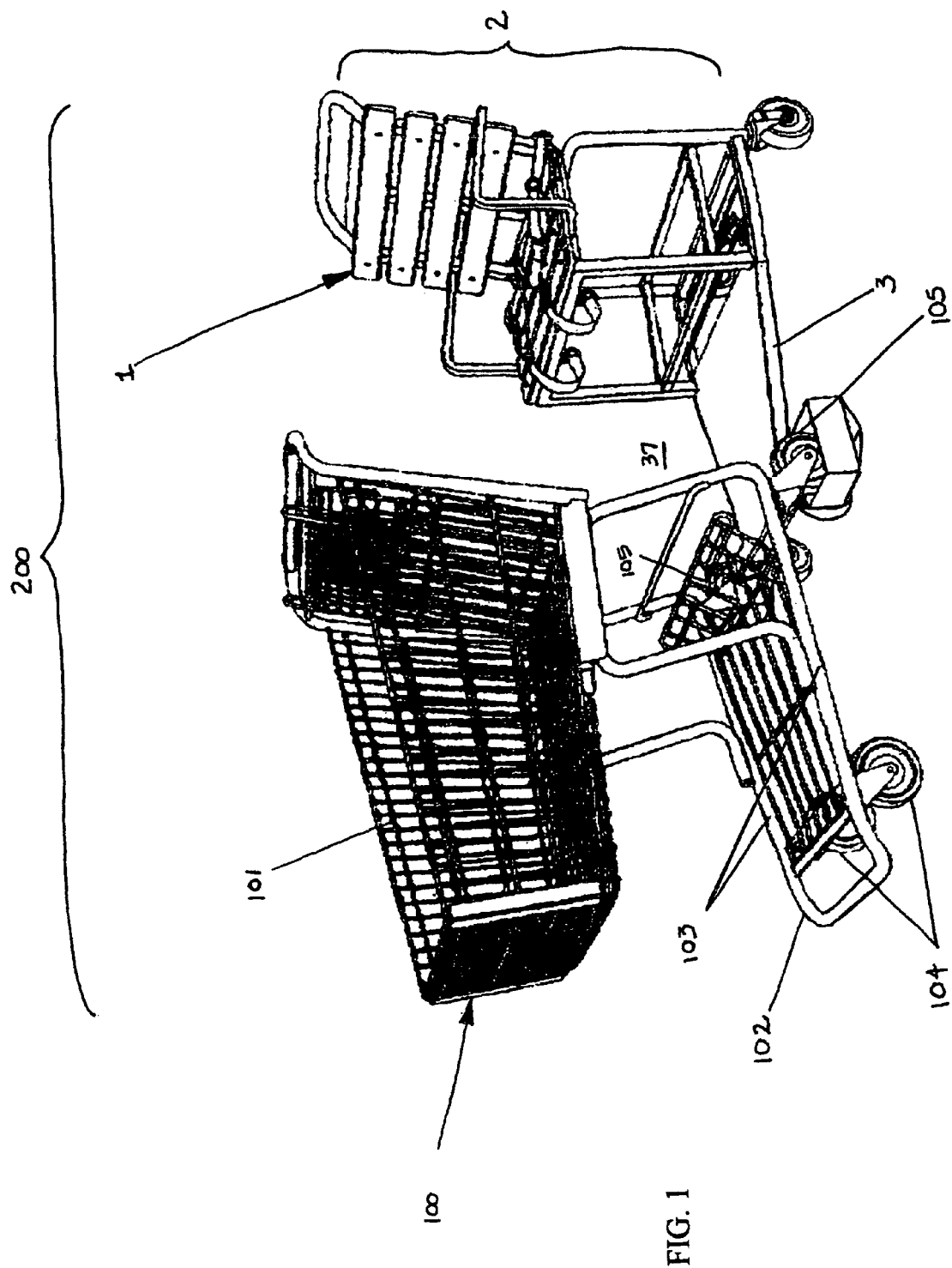
FIG. 1 is a perspective side view of a preferred embodiment of the seating/storage add-on section of the present invention attached to a shopping cart.

Referring to the drawings wherein like characters designate corresponding parts throughout the views and referring particularly to FIG. 1, there is shown the seating/storage add-on section 1 of the present invention with an attached shopping cart 100. When attached to each other, the add-on section 1 and the shopping cart 100 form a combined unit 200.

The seating/storage add-on section 1 of the present invention can be used with a conventional push-type shopping cart 100 used by shoppers to hold selected items for purchase. Generally, a conventional shopping cart 100 includes a receptacle, such as a basket 101, supported on a wheeled base 102. The wheeled base 102 typically includes a cart frame 103 with two front wheels 104 and two rear wheels 105. The front 104 and rear 105 wheels are attached to respective front and rear ends of the frame 103.

The seating/storage add-on section 1 comprises a seating assembly 2 and a base 3 supported by a plurality of wheels. The add-on section 1 also includes a non-rigid coupling means for holding the rear wheels 105 of a shopping cart 100 and thereby form a non-rigid connection with the cart 100.

Figure 2:
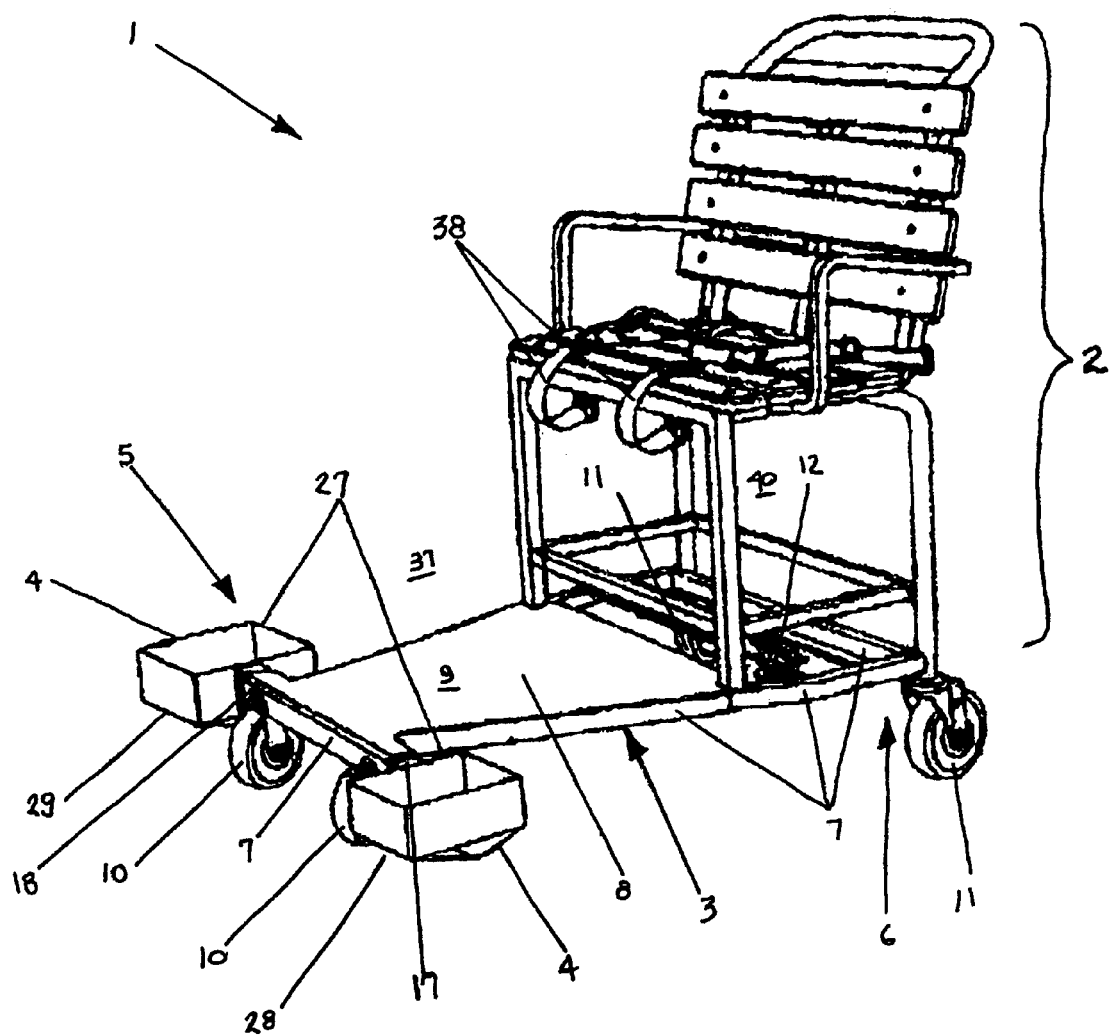
FIG. 2 is a perspective side view of the seating/storage add-on section of FIG. 1.
Figure 8:
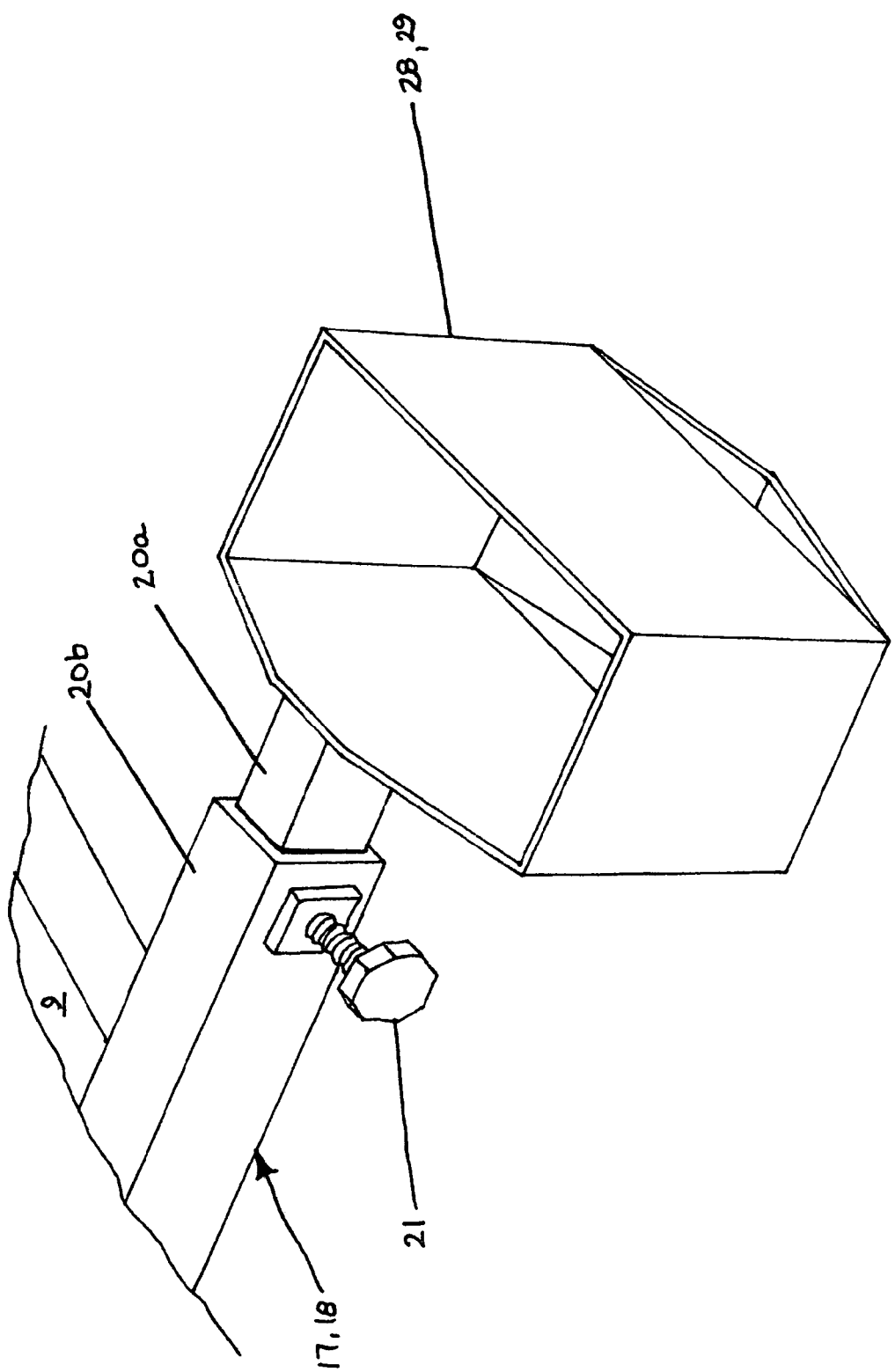
FIG. 8 is a partial perspective view of the add-on section of FIG. 1 showing one of the adjustable arms and one of the receptacles comprising the coupling means.

As shown in FIGS. 2 and 8, the coupling means is a non-rigid connector 4 comprising a holster 27. The holster 27 includes first 28 and second 29 receptacles attached to the frame 7 by receptacle adjusting means. The receptacle adjusting means include first 17 and second 18 adjustable arms. Each of the first 17 and second 18 adjustable arms comprises an inner 20a and outer 20b telescoping member held in selected adjustable positions by a locking element 21. Although each of the adjustable arms 17 comprises telescoping members 20a, 20b, other suitable adjusting devices could be used instead.

Figure 5:
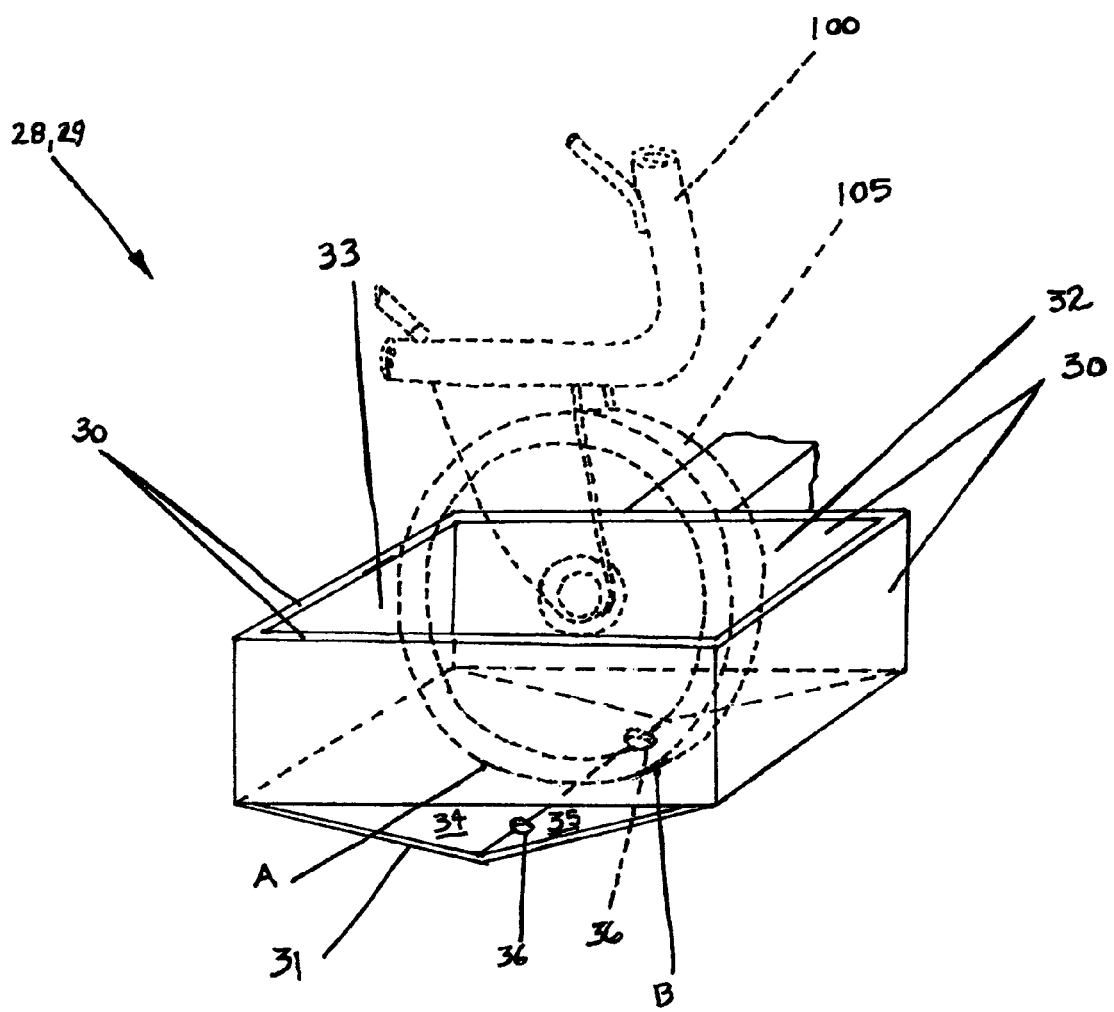
FIG. 5 is a partial perspective view showing a first preferred embodiment of one of the receptacles on the seating/storage add-on section of FIG. 1 holding a shopping cart wheel.

The first 28 and second 29 receptacles are mirror images of each other. Each receptacle 28,29 has side walls 30, a bottom wall 31 and a top opening 32 as shown in FIG. 5. An interior region 33 is bounded by the side 30 and bottom 31 walls of each respective receptacle 28,29.

Referring to FIG. 2, the base 3 of the seating/storage add-on section 1 has front 5 and rear 6 portions. The base 3 further comprises a frame 7 and a platform 8 which is mounted on the frame 7. The platform 8 is characterized by an upper surface 9. A leg room area 37 is located above the upper surface 9 of the platform 8. The plurality of wheels of the add-on section 1 includes two front casters 10 and two rear swiveable casters 11.

Figure 3:
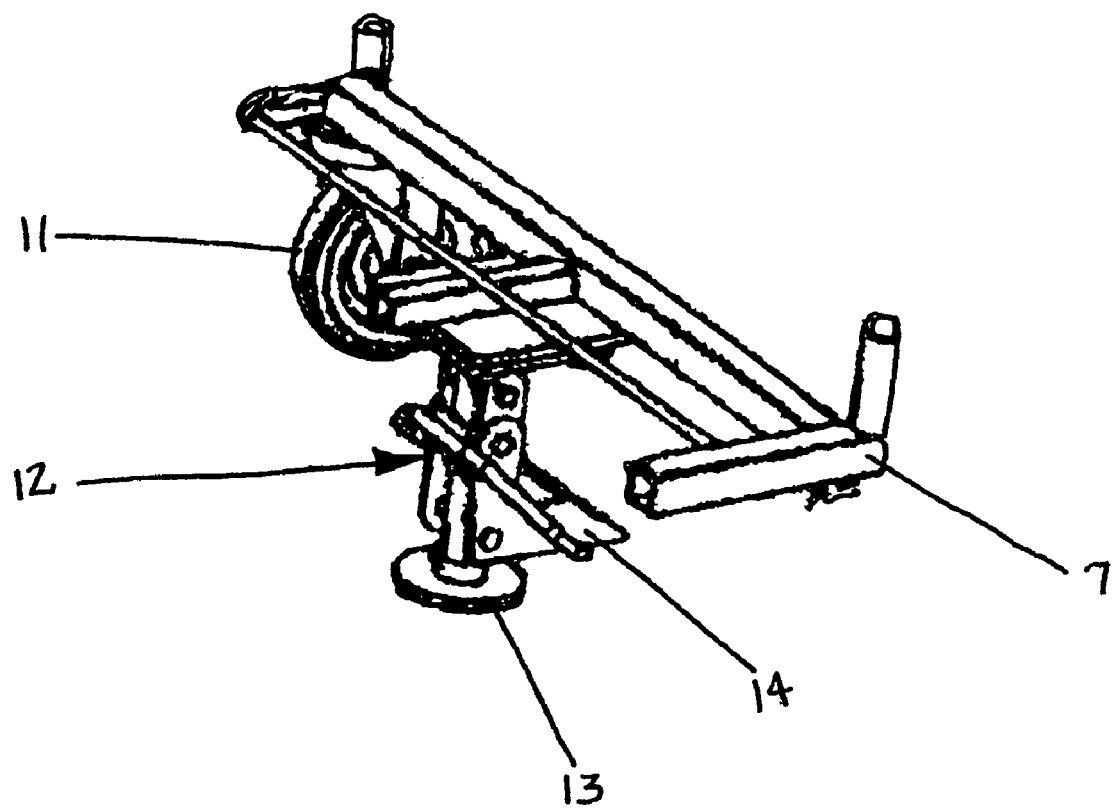
FIG. 3 is a partial view of the add-on section of FIG. 1 showing the brake mechanism and a portion of the frame.

The base 3 includes a brake mechanism 12. As shown in FIG. 3, the brake mechanism 12 comprises a brake pad 13 and a foot actuator 14. By manipulating the foot actuator 14 a user can engage or disengage the brake pad 13 to alternate the brake mechanism 12 between a locked position and an unlocked position. When the brake mechanism 12 is in the locked position, the brake pad 13 is engaged with the floor, and the rear casters 11 are disengaged or lifted from the floor to deter movement of the seating/storage add-on section 1. Conversely, when the brake mechanism 12 is in the unlocked position, the brake pad 13 is disengaged from the floor and the front 10 and rear 11 casters engage the floor, thereby allowing movement of the add-on section 1.

Figure 4:
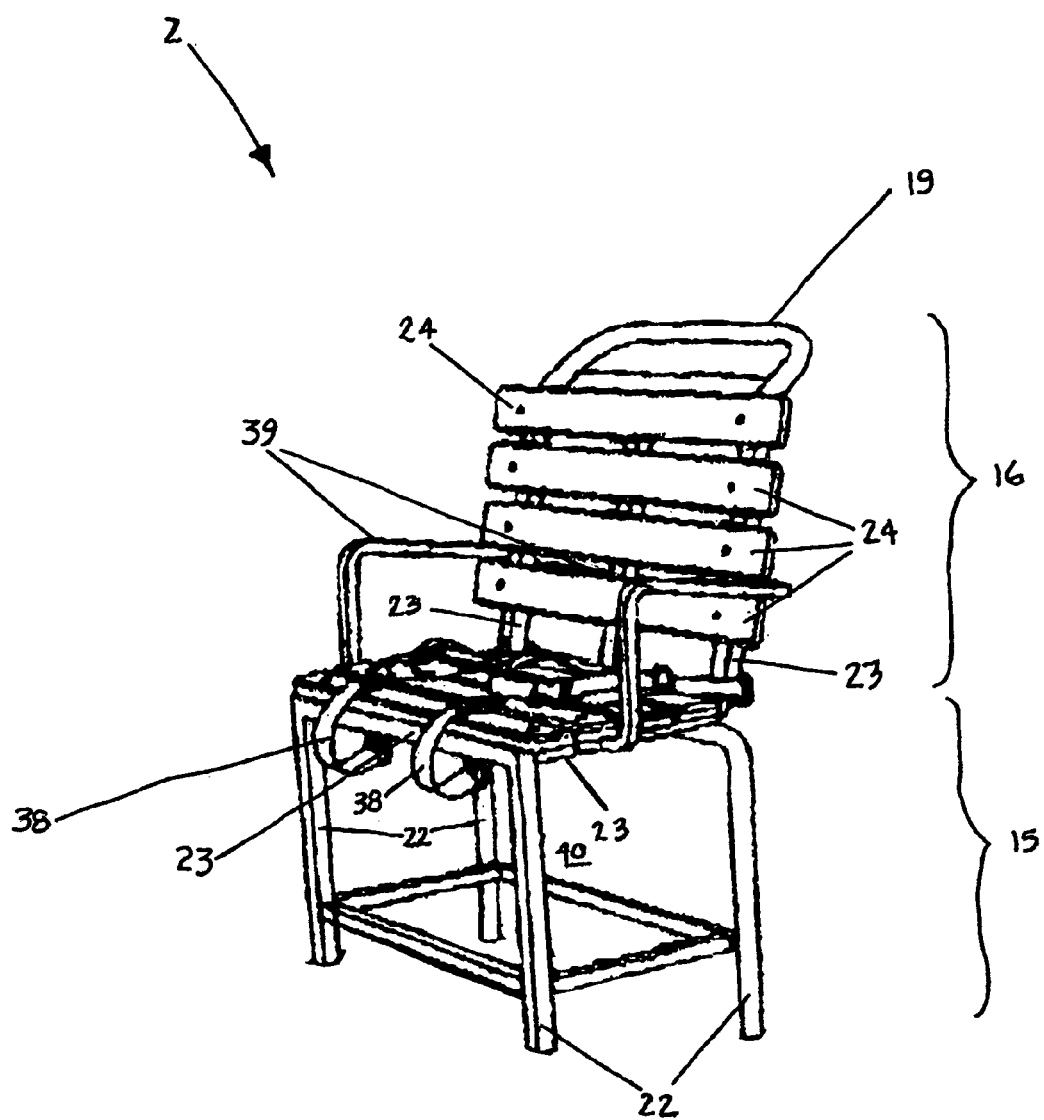
FIG. 4 is a perspective view of the seating assembly of the add-on section of FIG. 1.

The seating assembly 2 shown in FIG. 4 includes a seat support 15 and a seat portion 16. The seat portion 16 can accommodate one or more passengers in a seated position. A pair of arm rests 39 are included on the seat portion 16 and a handle 19 is mounted on the back of the seat portion 16.

The seat support 15 is formed by a plurality of tubular legs 22 with struts. The seat portion 16 is comprised of a plurality of tubular elements 23 and a plurality of slats 24. The slats 24 form the generally horizontal and the upwardly angled supporting surfaces of the seat portion 16.

The holster 27 is generally shaped to hold the rear wheels 105 of a shopping cart 100. In the preferred embodiment of FIG. 5, the bottom wall 31 of each receptacle 28,29 has a generally V-shaped cross section comprised of first 34 and second 35 surfaces. The first 34 and second 35 surfaces are angularly disposed to one another, so that a wheel resting in a respective receptacle 28,29 will contact at least two points A, B on the bottom wall 31. Point A is on the first surface 34 of the bottom wall 31 and point B is on the second surface 35. It should be understood that although only one of the receptacles 28,29 comprised by the holster 27 is shown in FIG. 5, the other receptacle (not shown) is a mirror image thereof.

Figure 7:
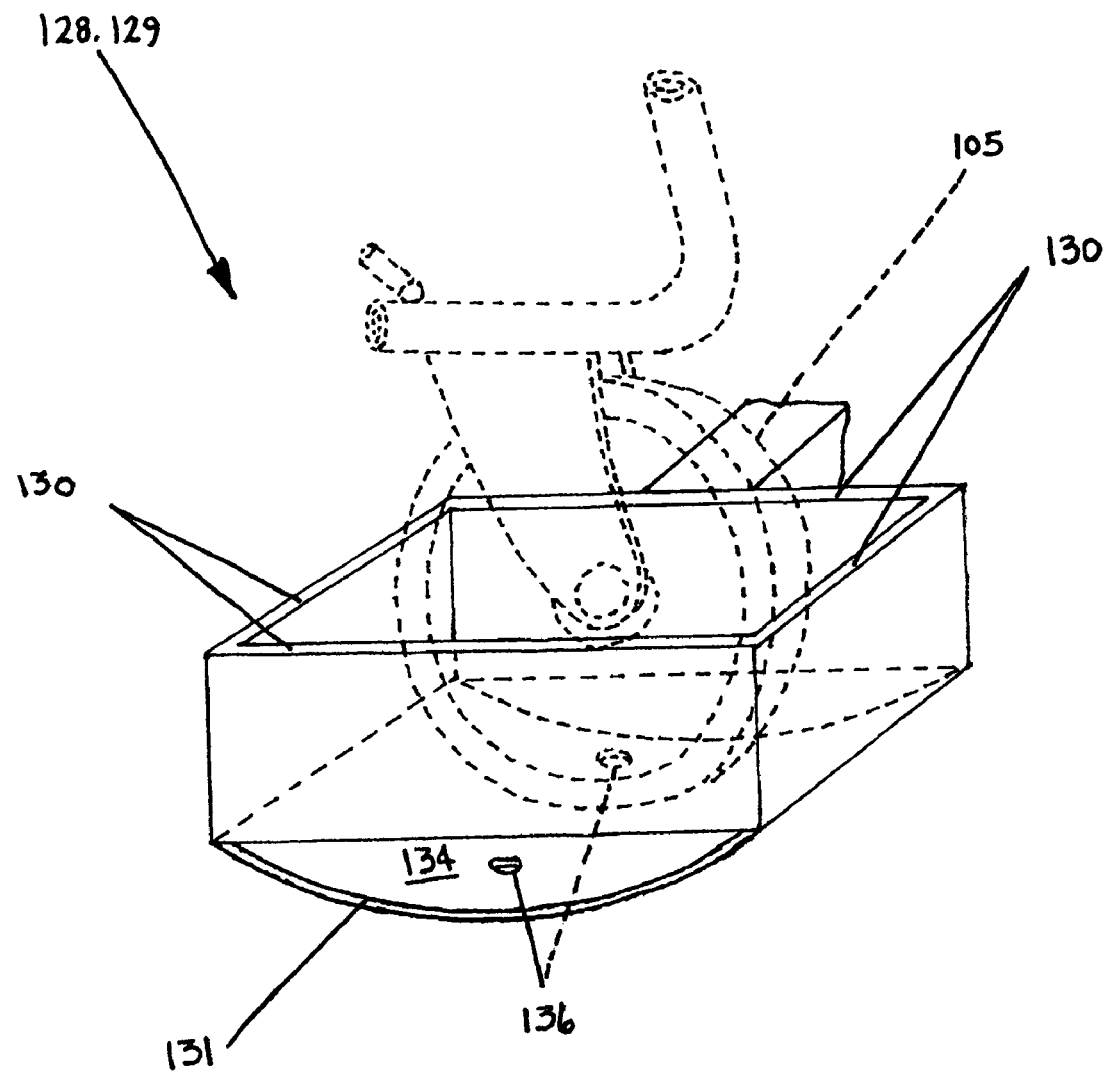
FIG. 7 is a partial perspective view showing a second preferred embodiment of one of the receptacles of the seating/storage add-on section of FIG. 1 holding a shopping cart wheel.

In another preferred embodiment as shown in FIG. 7, each of the first and second receptacles 128,129 have sidewalls 130 and a bottom wall 131. The bottom wall 131 has a curvilinear surface 134 which cradles the rear wheel 105 of an attached shopping cart 100. The closer the shape of the curvilinear surface 134 is to the circumferential shape of the cart's rear wheel 105, the larger the surface contact area is between the bottom wall 131 and the surface of the rear wheel 105 held thereby.

In FIGS. 1, 2 and 4, the frame 7 and platform 8 of the base 3, the seat support 15, handle 19, arm rests 39, tubular elements 23 of the seat portion 16, and the holster 27 are preferably made of steel, while the slats 24 on the seat portion 16 are plastic. It should be appreciated that the elements comprising the seating/storage add-on section 1 are not limited to the materials disclosed herein, but could be made of other suitable materials having the requisite durability and strength. Suitable materials could include wood, high strength plastics, aluminum and/or other metals.

The seating/storage add-on section 1 provides additional seating and storage space for a shopping cart 100. The non-rigid connector 4 releasably secures the shopping cart 100 to the seating/storage add-on section 1 by holding the cart's rear wheels 105 above the floor or other supporting surface. In addition, the cart 100 (with the general exception of its rear wheels) and the add-on section 1 can move relative to each other when attached by the non-rigid connector 4.

When the add-on section 1 is attached to a shopping cart 100 each of the first 28 and second 29 receptacles of the holster 27 holds a respective rear wheel 105 of a shopping cart 100 within its interior region 33. The bottom wall 31 of each receptacle 28,29 of FIG. 5 bears weight of the shopping cart's rear end. Disposed angularly to one another, the first 34 and second 35 surfaces provide a two point contact at points A and B on the bottom wall 31 for supporting a respective rear wheel 105. The two point contact steadies the rear wheel 105 and inhibits back and forth or rolling movement of the wheel 105 within the receptacle 28,29. The side walls 30 of each receptacle 28,29 also limit the back and forth movement of the cart wheels 105 when they are positioned within the holster 27.

Although some of the side walls 30 of the receptacles 28,29 have openings adjacent the bottom wall 31, the openings can be omitted so that the side walls 30 extend completely to bottom wall 31, if desired. At least one aperture 36 is disposed in the bottom wall 31 of each receptacle 28,29 to allow drainage from the interior region 33.

With front 10 and rear 11 casters supporting the respective front 5 and rear 6 portions of its base 3, the add-on section 1 can be easily maneuvered both by itself and with a shopping cart 100.

The platform 8 acts as a step for passengers entering or exiting the add-on section 1. For passengers seated on the add-on section 1, the platform serves as a foot rest. The location above the platform 8 and behind the shopping cart 100 of the combined unit 200 comprises the leg room area 37, an area in which seated passengers can comfortably position their legs.

The add-on section 1 can hold at least one adult or two children seated. Referring to FIG. 4, seat belts 38 on the seating assembly 2 secure the passenger(s) on the seat portion 16. The arm rests 39 add to the passenger's comfort and provide assistance for passengers entering and exiting the add-on section 1. The arm rests 39 also help to retain seated passengers on the seating assembly 2. The handle 19 on the back of the seating assembly 2 is for maneuvering the seating/storage add-on section 1 both alone and with the combined unit 200.

In a preferred embodiment, the slats 24 of the seating assembly 2 are disposed in an open construction arrangement. The open construction arrangement is characterized by spaces between the slats 24. The spaces allow bits of debris to fall through the seat portion 16, thereby hindering the collection of debris on the seat portion 16. The plastic composition, along with the open construction arrangement of the slats 24, facilitates cleaning of the seat portion 16.

The holster 27 can be adjusted by varying the distance between the receptacles 28,29 on the add-on section 1. This allows the connector 4 to attach to shopping carts having differently sized wheel bases. The adjustable arms 17,18 are disposed on opposite sides of the platform 8. To vary the distance between the receptacles 28,29 the effective length of each adjustable arm 17,18 is changed. The locking element 21 secures the telescoping members 20a,20b of the adjustable arms 17,18 against relative movement. When the locking element 21 is released, the telescoping members 20a,20b can slide relative to each other to adjust the arm's effective length.

Therefore, by releasing the locking element 21 and sliding the inner telescoping member 20a along the adjoining outer telescoping 20b, the distance between the receptacles 28,29 can be varied to fit various shopping carts. Although the adjustable arms 17,18 are shown to comprise telescoping members 20a,20b, other suitable adjustment means could be used instead.

In a preferred embodiment, the locking elements 21 comprise set screws. Although set screws are disclosed herein as locking elements 21 to secure the telescoping members 20a, 20b against relative movement, other suitable locking elements such as lock collars or detents could be used instead.

Figure 6:
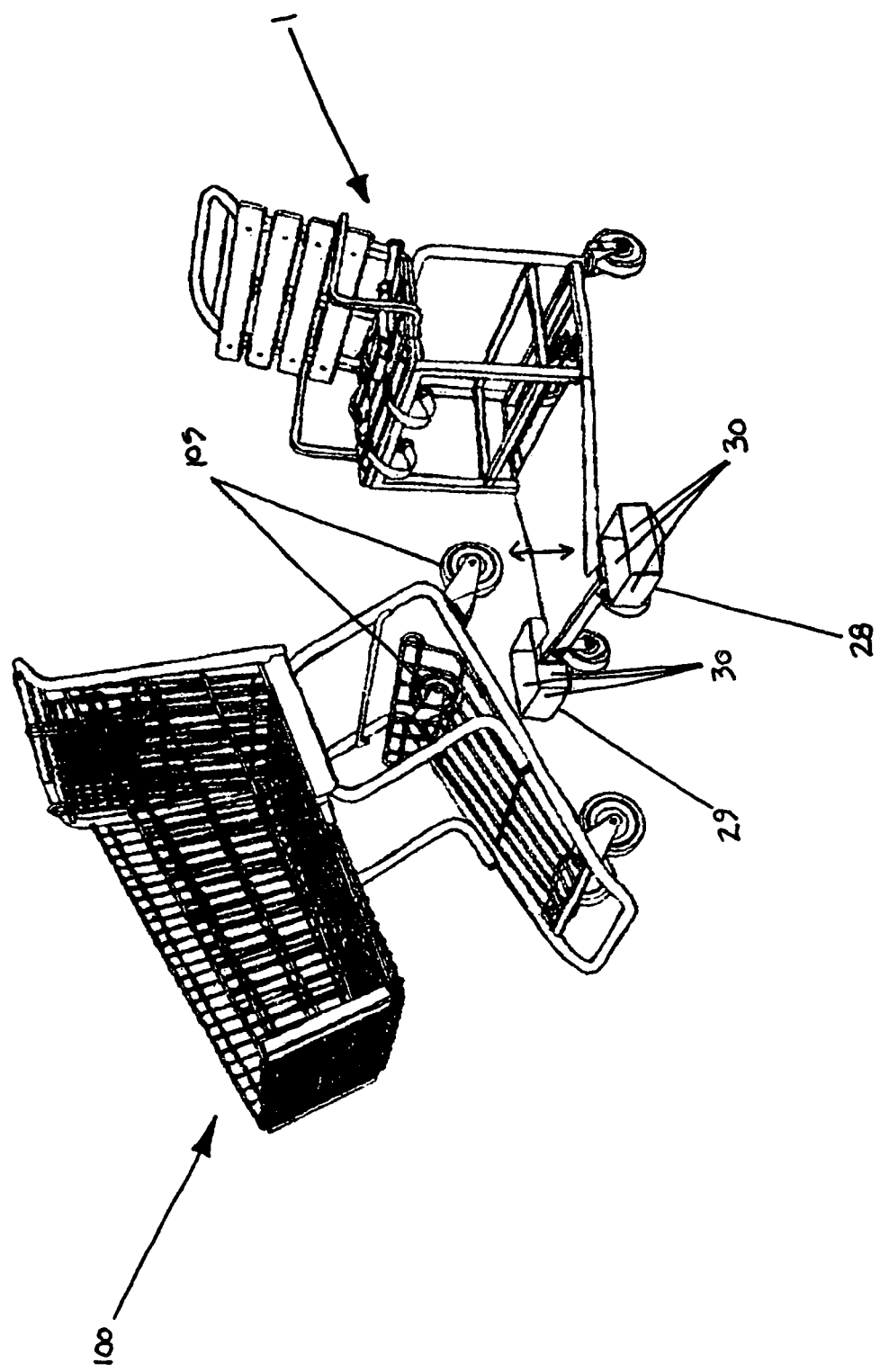
FIG. 6 is a perspective view of the seating/storage add-on section of FIG. 1 and a shopping cart having its rear wheels positioned above the holster.

Each top opening 32 as shown in FIGS. 5 and 6 provides access to the interior region 33 of each respective receptacle 28,29. When attaching a shopping cart 100 to the add-on section 1, the rear wheels 105 of the cart 100 can be readily placed into the interior region 33 of the respective receptacle 28,29 via the top opening 32.

Preferably, the rear wheels 105 of the cart 100 are placed in the holster 27 by positioning the cart's rear end over the front portion 5 of the add-on section and then lowering the wheels 105 into respective first 28 and second 29 receptacles. Each rear wheel 105 is lowered through a respective top opening 32 and into the interior region 33 until the wheel 105 rests on the bottom wall 31 of the receptacle 28,29.

In the preferred embodiment of FIG. 5, each rear wheel 105 of the cart 100 contacts the bottom wall 31 of the receptacle 28,29 on at least two points, A and B. The downward force component of the cart's weight keeps the cart's wheels 105 in contact with the bottom wall 31. However, the rear wheels 105 can be freely lifted out of their respective receptacles 28,29 when desired.

The seating assembly 2 is positioned on the rear portion 6 of the add-on section's base 3. The tubular legs 22 support the seat portion 16. A storage area 40 is located beneath the seat portion 16 of the seating assembly 2 and above the rear portion 6 of the platform 8. The spacing between the tubular legs 22 allows access to the storage area 40.

On the holster 27, the side walls 30 generally extend upwardly from the respective bottom wall 31 of each receptacle 28,29. Each of the interior regions 33 is sized to receive the rear wheel 105 of a shopping cart therein. The two opposing longitudinal side walls 30 of each receptacle 28,29 are at least greater in length than the diameter of the cart's rear wheels 105. The two other side walls 30 of the receptacle 28,29 are at least greater in length than the width of the rear wheel 105.

Furthermore, the bottom wall 31 of each receptacle 28,29 has at least two planar surfaces that are disposed at an angle to one another so that a cross section of the bottom wall 31 is generally V-shaped. The angle formed by the first 34 and second 35 surfaces is an obtuse angle, although the magnitude of the angle could be varied if desired.

In the preferred embodiment of FIGS. 1–3, the holster 27 is attached to the platform 8. The first 28 and second 29 receptacles of the holster 27 are on respective left and right sides of the front portion 5 adjacent to a respective front caster 10. Each receptacle 28,29 is attached along one of its side walls 30 to a respective adjustable arm 17,18. Each receptacle 28,29 can be adjusted to selected positions spaced from the platform 8 by varying the length of the attached adjustable arm 17,18. With each receptacle 28,29 of the holster 27 adapted to hold one of the cart's rear wheels 105, the receptacles 28,29 can be adjusted to accommodate the distance between the cart's rear wheels 105.

In the combined unit 200, the rear end of the cart 100 is adjacent to the front portion 5 of the add-on section 1. The leading edge of the leg room area 37 is bounded by the rear end of the cart 100.

The brake mechanism 12 is mounted on the base 3 of the add-on section 1 as shown in FIGS. 2 and 3. Preferably, the brake mechanism 12 is positioned between the rear swivelable casters 11 and within easy access of a user standing adjacent the rear portion 6 of the add-on section 1.

The rear swivelable casters 11 of the add-on section 1 are mounted on the rear portion 6 of the base 3, while the front casters 10 are mounted on the front portion 5 thereof.

In a preferred use, the coupling means is adjusted to fit the shopping cart 100, if necessary. The seating/storage add-on section 1 is attached to a shopping cart 100 via the coupling means. Passengers and/or items are loaded onto the add-on section 1 and the combined unit 200 is maneuvered as desired. However, the add-on section could be loaded before attaching the shopping cart.

To adjust the non-rigid connector 4 to fit a particular shopping cart's wheel base, the locking element 21 on one or both of the telescoping members 20a,20b is released, thereby allowing the telescoping members 20a,20b to move with respect to each other. As the cooperating telescoping members 20a,20b slide with respect to each other, the effective length of the respective adjustable arm 17,18 is varied and the distance between the receptacles 28,29 changes. Using the distance between the rear wheels 105 of the shopping cart 100 as a measurement guide, the receptacles 28,29 are moved the desired distance apart and the locking element 21 is engaged to secure the adjustable arms 17,18 and the receptacles 28,29 in position.

To connect, the cart 100 and add-on section 1 are aligned so that the rear of the shopping cart 100 is positioned adjacent to the front portion 5 of the add-on section 1 as shown in FIG. 6. Respective left and right rear wheels 105 are adjacent to the first 28 and second 29 receptacles. The rear end of the shopping cart 100 is lifted so that the rear wheels 105 are above the side walls 30 of the receptacles 28,29. Next, the first receptacle 28 is vertically aligned with the left rear wheel 105 of the cart 100 and the second receptacle 29 is vertically aligned with the right rear wheel 105 by moving the rear end of the cart 100 over the front portion 5 of the add-on section 1 or by alternately moving the add-on section's front portion 5 underneath the shopping cart 100.

With the cart's wheels 105 and receptacles 28,29 aligned thusly, the rear end of the shopping cart 100 is lowered until the left and right rear wheels 105 are positioned in the respective first 28 and second 29 receptacles of the holster 27 and are resting on the bottom walls 31 of the respective receptacles 28,29. Grasping the handle 19 of the add-on section 1, a user can push and maneuver the combined unit 200 as desired.

To detach the add-on section 1 from the shopping cart 100, the rear wheels 105 are lifted up above the side walls 30 and moved away from the receptacles 28,29. The unattached seating/storage add-on section 1 is fully supported by its front 10 and rear 11 casters. Therefore, when unattached to a cart 100, the add-on section 1 can be easily rolled about. The add-on section 1 can also remain loaded while the cart 100 is attached and detached therefrom.

As a combined unit 200, the add-on section 1 and shopping cart 100 can move relative to one another. The rear wheels 105 of the attached shopping cart 100 remain relatively stationary within in the holster 27, while the rest of the cart 100 is allowed to move. With the rear wheels 105 held in the holster 27, the rest of the cart 100 can pivot about the horizontal axis 108 of the rear wheels 105. Due to this relative movement between the shopping cart 100 and the add-on section 1, the combined unit 200 can move smoothly over uneven terrain without undue stress being placed on the coupling means.

The seating/storage add-on section of the present invention which provides additional seating and storage for a shopper can be readily attached and detached from a shopping cart. Consequently, it is not required to dedicate a shopping cart for exclusive use with the add-on section. The cart and add-on section can be quickly separated if the add-on section is not needed with the shopping cart. The shopping cart can also be readily detached if exclusive use of the seating/storage add-on section is desired.

With the add-on section and cart being readily separable, the seating/storage add-on section can be stored separately from the cart, thereby reducing the amount of storage area required for shopping carts.

The holster is a non-rigid coupling means that enables an attached shopping cart to move independently of the add-on section. Allowing for this relative movement to occur accommodates unevenness in the terrain and lessens the stress on the connector, without comprising maneuverability of the combined unit. With less stress on the connector, the usable life of the add-on section is extended.

Although the present invention has been described in considerable detail with reference to certain preferred versions thereof, other versions are possible.

The invention claimed is:

1. A seating/storage add-on section for use with a shopping cart, wherein the shopping cart includes a receptacle mounted on a cart frame, and a plurality of cart wheels which includes a pair of rear wheels supporting the cart frame, the seating/storage add-on section comprising:
  a base having a front portion and a rear portion;
  a plurality of wheels supporting the base;
  a seating assembly on said base; and
  a non-rigid connector for releasably holding the rear wheels of the shopping cart, wherein said non-rigid connector is disposed on the front portion of said base;
  a brake mechanism comprising a brake pad and a foot actuator, said brake mechanism further comprising locked and unlocked positions;
  a storage area; and
  a passenger leg room area;
  said base includes a frame and platform, wherein said platform is mounted on the frame at the front portion of the base; and said storage area is located on the rear portion of the base frame;
  said seating assembly comprises a seat support, a seating portion and a handle;
  said non-rigid connector comprising first and second receptacles and receptacle adjusting means for selectively adjusting the distance between the first and second receptacles;
  each of said first and second receptacles comprises side walls, a bottom wall, an interior region and an open end, said side walls extend generally upwardly from said bottom wall to define the interior region;
  said receptacle adjusting means comprises first and second adjustable arms, wherein one end of said first arm is attached to said first receptacle and an opposite end of said first arm is attached to a left side of said platform; one end of said second arm is attached to said second receptacle and an opposite end of said second arm is attached to a right side of said platform such that each of said first and second receptacles are respectively disposed on left and right sides of said base;
  each of said first and second adjustable arms comprises inner and outer telescoping members and a set screw to lock the inner and outer telescoping members in selective engagement;
  said plurality of wheels includes a pair of rear swivelable casters attached to the rear portion of the base and a pair of front casters attached to the front portion of the base;
  said platform is disposed on said frame and has an upper surface that is generally planar;
  said leg room area is disposed above the platform between the seat base and the non-rigid connector;

said seat support comprises a plurality of tubular legs that extend upwardly from the rear portion of the base;

said handle is attached to said seat portion and is adapted for gripping by a user;

wherein to attach the shopping cart to the add-on section each rear wheel of the shopping cart is placed in a respective first and second receptacle with the rear end of the shopping cart being adjacent to the front portion of the base;

when attached the add-on section and shopping cart are maneuvered by the handle, wherein the frame and receptacle of the shopping cart can move independently of said add-on section; and wherein to detach the shopping cart from the add-on section, the rear wheels of the shopping cart are removed from the respective first and second receptacles.

2. The seating/storage add-on section of claim 1, wherein each of said bottom walls comprises first and second surfaces adjacent to the interior region, said first and second surfaces are generally planar and said first surface is disposed at an obtuse angle to said second surface, such that a cart wheel resting on the bottom wall contacts at least one point on said first surface and at least one point on said second surface.

3. The seating/storage add-on section of claim 1, wherein each of said bottom walls is curvilinear.

* * * * *